United States Patent [19]

Mammano et al.

[11] Patent Number: 5,422,562
[45] Date of Patent: Jun. 6, 1995

[54] SWITCHING REGULATOR WITH IMPROVED DYNAMIC RESPONSE

[75] Inventors: Robert A. Mammano, Costa Mesa, Calif.; John A. O'Connor, Merrimack, N.H.

[73] Assignee: Unitrode Corporation, Billerica, Mass.

[21] Appl. No.: 183,720

[22] Filed: Jan. 19, 1994

[51] Int. Cl.$^6$ .................................................. G05F 1/56
[52] U.S. Cl. ...................................... 323/282; 323/222; 323/284; 327/538
[58] Field of Search ............... 323/222, 224, 268, 266, 323/282, 284, 285; 307/491

[56] References Cited

U.S. PATENT DOCUMENTS

| | | | |
|---|---|---|---|
| 3,523,239 | 8/1970 | Heard | 323/20 |
| 3,641,422 | 2/1972 | Farnsworth et al. | 323/8 |
| 3,737,755 | 6/1973 | Calkin et al. | 321/2 |
| 3,742,330 | 6/1973 | Hodges et al. | 321/9 A |
| 3,909,695 | 9/1975 | Peck | 321/2 |
| 4,168,477 | 9/1979 | Burchall | 323/23 |
| 4,186,311 | 1/1980 | Bohringer | 315/411 |
| 4,316,242 | 2/1982 | Colangelo et al. | 363/21 |
| 4,319,359 | 3/1982 | Wolf | 375/22 |
| 4,347,474 | 8/1982 | Brooks et al. | 323/224 |
| 4,395,675 | 7/1983 | Toumani | 323/271 |
| 4,425,612 | 1/1984 | Bahler et al. | 363/21 |
| 4,459,537 | 7/1984 | McWhorter | 323/224 |
| 4,504,882 | 3/1985 | Breton | 361/93 |
| 4,514,679 | 4/1985 | Schierjott | 323/222 |
| 4,521,725 | 6/1985 | Phaneuf | 323/282 |
| 4,521,726 | 6/1985 | Budnik | 323/283 |
| 4,533,986 | 8/1985 | Jones | 363/17 |
| 4,618,812 | 10/1986 | Kawakami | 323/224 |
| 4,622,629 | 11/1986 | Glennon | 363/70 |
| 4,626,979 | 12/1986 | JaQuay | 363/41 |
| 4,686,615 | 8/1987 | Ferguson | 363/17 |
| 4,713,742 | 12/1987 | Parsley | 363/124 |
| 4,761,722 | 8/1988 | Pruitt | 363/17 |
| 4,885,674 | 12/1989 | Varga et al. | 363/21 |
| 4,947,101 | 8/1990 | McVey | 323/272 |
| 4,958,268 | 9/1990 | Nagagata et al. | 363/16 |
| 4,967,138 | 10/1990 | Obergfell et al. | 323/224 |
| 5,111,133 | 5/1992 | Poulo et al. | 323/286 |
| 5,260,644 | 11/1993 | Curtis | 323/226 |
| 5,305,192 | 4/1994 | Bonte et al. | 363/21 |
| 5,338,977 | 8/1994 | Carobolante | 307/270 |

*Primary Examiner*—Thomas M. Dougherty
*Assistant Examiner*—Adolf Berhane
*Attorney, Agent, or Firm*—Weingarten, Schurgin, Gagnebin & Hayes

[57] ABSTRACT

A switching regulator having improved dynamic response to load variations includes a load compensation circuit coupled to the output terminal. The load compensation circuit supplies current to a load coupled to the output terminal when the output voltage is less than a first predetermined level and/or diverts current away from the load when the output voltage is greater than a second predetermined level. The load compensation circuit operates in this manner until the output voltage is between the first and second predetermined levels. The load compensation circuit responds faster to load variations than the switching regulator to accommodate sudden changes in the load demand.

29 Claims, 4 Drawing Sheets

SWITCHING REGULATOR WITH IMPROVED DYNAMIC RESPONSE

FIELD OF THE INVENTION

This invention relates generally to power supplies and more particularly, to a switching regulator power supply having an improved dynamic response.

BACKGROUND OF THE INVENTION

Switching power supplies include a power switch for alternately coupling and decoupling an unregulated input voltage source to an output terminal to which a load is coupled. An output filter, including an inductor and a capacitor, is coupled between the power switch and the regulator output terminal and averages pulses of the input voltage to provide a DC output voltage at the output terminal. A feedback circuit controls the duty cycle of the power switch in order to maintain the output voltage at a substantially constant level.

As is known in the art of switching power supplies, load variations can detrimentally affect the regulation of the DC output voltage. That is, load increases tend to cause the output voltage to drop whereas load decreases tend to cause the output voltage to rise. When load variations occur relatively slowly, the regulator may respond quickly enough to prevent the output voltage from deviating from an acceptable tolerance range. However, in instances where load variations occur quicker than the rate of response of the regulator, the output voltage may disadvantageously deviate from the acceptable range.

One factor which limits the speed with which the regulator responds to load variations is the size of the output filter inductor. That is, the rate of change of current through the inductor is inversely related to the inductance. Thus, one way to improve the regulator response time is to decrease the size of the output inductor. However, as the inductance is decreased, the frequency at which the power switch is operated must generally increase, thereby increasing switching losses.

Another way to improve the regulator response time is to increase the size of the output capacitor. That is, the larger the output capacitor, the more charge stored and available for accommodating varying load requirements. However, cost and size considerations, as well as increased losses related to the equivalent series resistance associated with capacitors, limit the feasibility of increasing the size of the output capacitor.

SUMMARY OF THE INVENTION

In accordance with the present invention, a switching regulator power supply includes a load compensation circuit coupled to an output terminal of the regulator to accommodate sudden, or rapid load variations until the output voltage returns to within a specified tolerance range. The regulator includes a power switch for alternately coupling and decoupling an unregulated input voltage source to an output filter and then to the output terminal at a predetermined frequency and with a predetermined duty cycle. A feedback circuit is provided for controlling the duty cycle of the power switch in order to maintain the output voltage within a specified tolerance range related to a nominal voltage level. The output filter, including an inductor and a capacitor, is coupled between the power switch and the regulator output terminal for converting the pulses of input voltage to an average DC output voltage. Due to response time limitations of the voltage regulator, such as may be caused by the filter inductor, the load compensation circuit responds faster to sudden load changes than the regulator.

The load compensation circuit is activated to supply current to a load coupled to the output terminal when the output voltage is less than a first predetermined level and/or to divert current away from the load when the output voltage is greater than a second predetermined level. The first predetermined level is less than the nominal level of the DC output voltage and the second predetermined level is greater than the nominal level of the DC output voltage. With this arrangement, the load compensation circuit boosts the DC output voltage when load increases cause the output voltage to fall below an acceptable level and reduces the DC output voltage when load reductions cause the output voltage to rise above an acceptable level. The load compensation circuit is de-activated once the output voltage is between the first and second predetermined voltage levels.

In one embodiment, the load compensation circuit includes a first current amplifier coupled between the regulator input voltage source and the output terminal and having a control terminal coupled to a first threshold voltage. A second current amplifier is coupled between the output terminal and ground and has a control terminal coupled to a second threshold voltage. With this arrangement, the first current amplifier operates as a current source to supply current to the load and the second current amplifier operates as a current sink to divert current away from the load. The first and second predetermined levels of output voltage capable of activating and de-activating the current sourcing and sinking current amplifiers are determined by the first and second threshold voltages, respectively.

The current sourcing and sinking current amplifiers are operable to source or sink a current that varies linearly with the output voltage. Thus, such linear first and second current amplifiers are operable in a plurality of conduction states in order to vary the supplied or diverted current, respectively, in accordance with the changing load requirement.

The feedback circuit includes an error amplifier and a controller, such as a pulse with modulation (PWM) controller. In one embodiment, the error amplifier receives a signal proportional to the DC output voltage and a reference voltage and provides an error, or difference, signal to the PWM controller. The reference voltage coupled to the error amplifier, the first threshold voltage coupled to the control terminal of the first current amplifier, and the second threshold voltage coupled to the control terminal of the second current amplifier may be derived from a single reference voltage source, such as with the use of a resistor divider network. With this arrangement, the first and second threshold voltages track the DC output voltage, thereby minimizing the effect of component tolerances on the activation and de-activation of the load compensation circuit.

Buffer amplifiers may be coupled between the reference voltage source providing the first and second threshold voltages and the control terminals of the first and second current amplifiers in order to reduce loading effects. In this way, the first and second threshold voltage levels, which determine the output voltage levels at which the load compensation circuit is activated and de-activated, are accurately maintained.

An inhibit circuit is provided for disabling the current sourcing capability of the load compensation circuit during a short circuit condition across the regulator's output. In one embodiment, the inhibit circuit compares a signal proportional to the output voltage to a threshold voltage which is characteristic of a short circuit across the regulator's output and provides an inhibit signal for disabling the current sourcing capability of the load compensation circuit. More particularly, a comparator receives the output voltage and a voltage of a third predetermined level indicative of the output voltage when the regulator's output is shorted. The comparator provides a disable output signal when the output voltage is less than the third predetermined voltage level in order to disable the first, sourcing current amplifier. With this arrangement, the load compensation circuit is prevented from sourcing current to the output terminal when the regulator's output is shorted.

In another embodiment, the inhibit circuit limits the duration of activation of the first, current sourcing current amplifier. This arrangement ensures that current is not sourced by the compensation circuit to the output terminal during a steady state short circuit condition across the regulator's output. However, the duration of activation is long enough to enable the current amplifier to respond to dynamic increases in the load demand.

BRIEF DESCRIPTION OF THE DRAWINGS

The foregoing features of this invention, as well as the invention itself, may be more fully understood from the following detailed description of the invention in which.

DESCRIPTION OF THE PREFERRED EMBODIMENT

Figure 1:
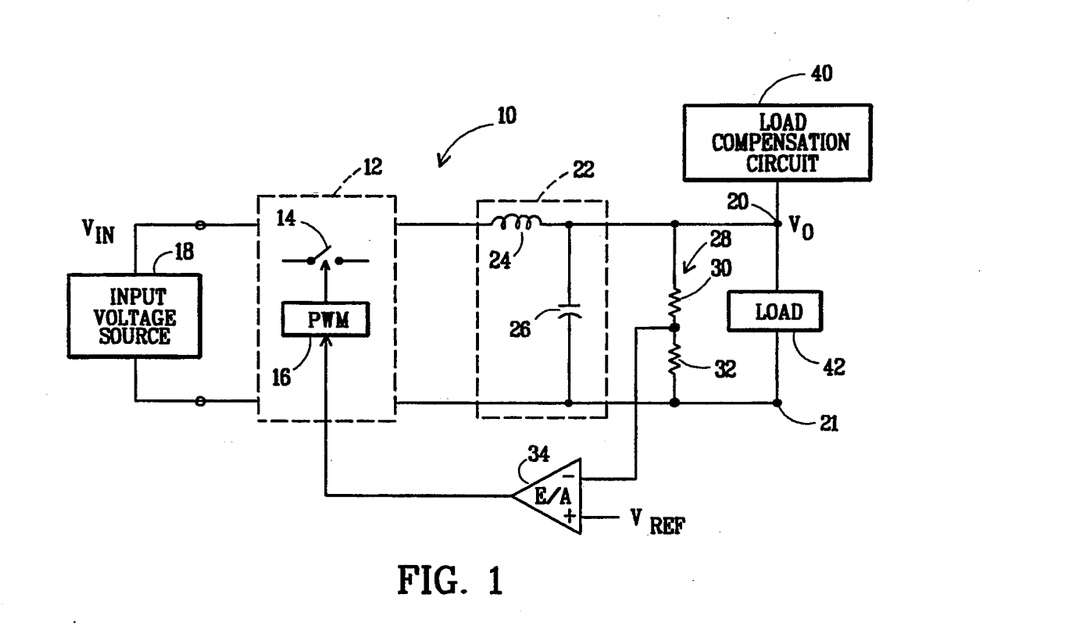
FIG. 1 is a block diagram of a switching regulator in accordance with the present invention.

Referring to FIG. 1, a switching regulator power supply 10 adapted for coupling to a load 42 is shown to include a switching section 12 comprising a power switch 14 and a control circuit, such as a pulse width modulator (PWM) 16, for controlling the operation of the power switch 14. The power switch 14 alternately couples and decouples an unregulated direct current (DC) input voltage source 18 to and from an output terminal 20 of the regulator via an output filter 22. The output filter 22, including an inductor 24 and a capacitor 26, is coupled between the switching section 12 and the output terminal 20 and converts pulses of input voltage to an average DC output voltage $V_O$. More particularly, during intervals of conduction of the power switch 14, the input voltage source 18 supplies current to the load 42 through a series path including power switch 14 and inductor 24. During intervals of non-conduction of the power switch 14, charge previously stored in the inductor 24 and capacitor 26 supplies the load 42.

The DC output voltage $V_O$ is regulated, or maintained substantially constant, with a feedback circuit including an error amplifier 34 and a PWM controller 16. Error amplifier 34 receives the DC output voltage as shown and a reference voltage $V_{REF}$ from a resistor divider 48 and provides an error, or difference, signal to the PWM controller 16. The PWM controller 16 may additionally receive a signal proportional to the current through the inductor 24 in the manner of current mode control. In response to the error signal, the PWM controller 16 controls the duty cycle of the power switch 14 in order to maintain the output voltage $V_O$ substantially constant at a predetermined nominal level. Under normal operating conditions however, variations in the input voltage source 18, specified load variations, and component tolerances cause the output voltage $V_O$ to vary within a specified tolerance range about the nominal level.

The switching regulator 10 includes a load compensation circuit 40 coupled to the output terminal 20 of the regulator 10. The load compensation circuit 40 either (1) sources a current to the load 42 when the DC output voltage $V_O$ is less than a first predetermined level; (2) sinks a current away from the load 42 when the DC output voltage $V_O$ is greater than a second predetermined level; or (3) both sources a current to the load 42 when the output voltage $V_O$ is less than the first predetermined level and sinks a current away from the load 42 when the output voltage $V_O$ is greater than the second predetermined level. The load compensation circuit 40 operates in this manner to react to, and accommodate, sudden load variations only until the output voltage returns to within the specified tolerance range (i.e., between the first and second predetermined voltage levels). The load compensation circuit 40 responds more rapidly to sudden changes in load current demand than the regulator can due to regulator response time limitations such as the output inductor 24.

More particularly, certain load variations occur slow enough for the current through the inductor 24 to change accordingly to accommodate the load variation before the output voltage $V_O$ deviates from the specified range. Under these conditions, the load compensation circuit 40 remains inoperative. However, in other instances, the maximum rate of change of current through the inductor 24 may be too slow to prevent the output voltage $V_O$ from deviating from the specified range. In these instances, the load compensation circuit 40 temporarily boosts the output current to keep the DC output voltage from falling when load increases cause the output voltage to drop and/or temporarily reduces the DC output voltage when load reductions cause the output voltage to increase.

Figure 2:
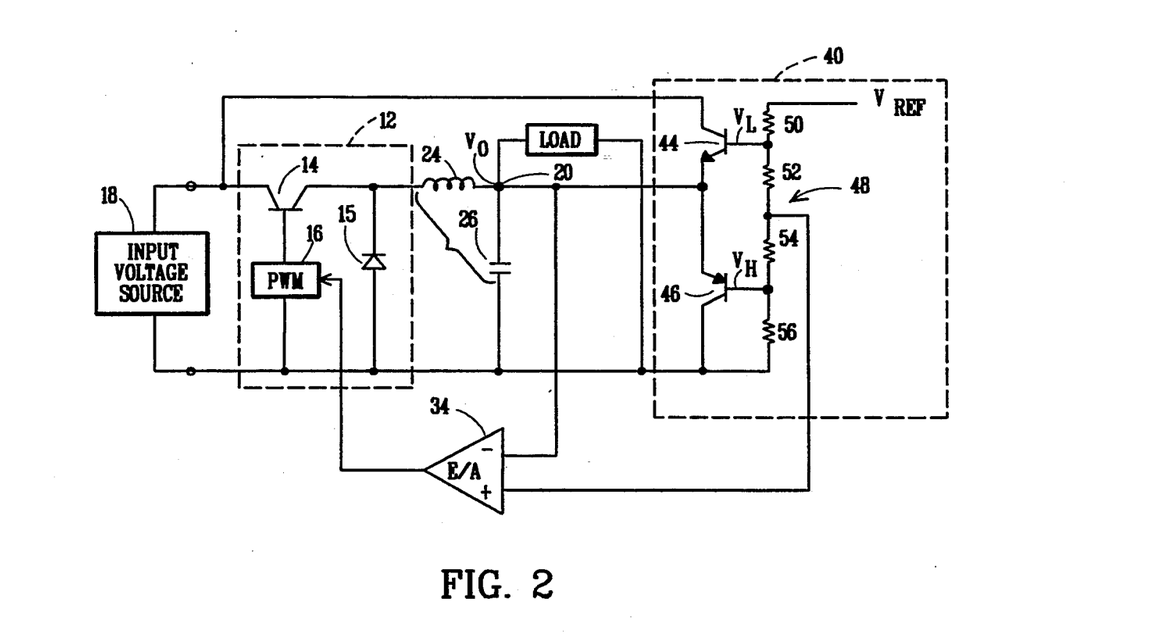
FIG. 2 is a schematic diagram of one embodiment of the switching regulator of FIG. 1.

Referring to FIG. 2, the switching section 12 is shown to be of a buck converter topology. Specifically, the switching section 12 includes power switch 14 coupled in series between input and output terminals of the switching section 12 and a diode 15 coupled across the output terminals of the switching section 12. In operation, during conduction of power switch 14, current is supplied to the load 42 and to charge the output capacitor 26 via the series path from input voltage source 18, through switch 14, and inductor 24. During intervals of non-conduction of the switch 14, energy stored in the inductor 24 causes the diode 15 to conduct and the load 42 is supplied by the inductor current and charge previously stored in the capacitor 26 during intervals of conduction of the power switch 14.

One embodiment of the load compensation circuit 40 is shown in FIG. 2 to include a pair of current amplifiers 44, 46. Illustrative current amplifiers 44, 46 are bipolar npn and pnp transistors, respectively. However, those of skill in the art will appreciate that other types of current amplifiers are suitable for use in conjunction with the present invention. The first transistor 44 has a first terminal coupled to the input voltage source 18, a second terminal coupled to the regulator output terminal 20 and a third, control terminal coupled to a first threshold voltage $V_L$. The second transistor 46 has a first terminal coupled to the return terminal 21 of the regulator 10, or ground, a second terminal coupled to the regulator output terminal 20, and a third, control terminal coupled to a second threshold voltage $V_H$.

The first and second threshold voltages $V_L$, $V_H$, are provided by a resistor divider network 48 including resistors 50, 52, 54, and 56 coupled across a reference voltage source $V_{REF}$. Threshold voltages $V_L$, $V_H$ determine the first and second predetermined levels of output voltage $V_O$ capable of activating and de-activating the load compensation circuit 40 to source current to the load 42 or to sink current away from the load 42, respectively, as will become apparent. Suffice it here to say that preferably, the levels of the first and second threshold voltages $V_L$, $V_H$ are selected to ensure that the load compensation circuit 40 is activated only once the output voltage deviates from within a specified tolerance range.

In operation, when the output voltage $V_O$ is within the specified output voltage tolerance range, transistors 44 and 46 are biased to their non-conducting states and the load compensation circuit 40 is de-activated. With transistors 44 and 46 in their non-conducting states, the load compensation circuit 40 does not effect the switching regulator 10 or the output voltage $V_O$ provided thereby.

If the output voltage $V_O$ falls to a level equal to approximately one base-to-emitter voltage drop of transistor 44 (i.e., $V_{be1}$) below the first threshold voltage level $V_L$, such as may occur when there is a sudden increase in the load requirement, transistor 44 begins to conduct. That is, transistor 44 conducts when the output voltage $V_O$ is approximately equal to or less than $V_L - V_{be1}$. Thus, the first predetermined voltage level, corresponding to the level of output voltage capable of activating the load compensation circuit 40 to source current to the load 42, is equal to $V_L - V_{be1}$.

Conduction of transistor 44 causes current to be sourced from the input voltage source 18 through transistor 44 and to the load 42 coupled to the regulator output terminal 20. Transistor 44 is linearly operable as a function of the voltage across its base and emitter terminals and thus, also as a function of the output voltage $V_O$ coupled to its emitter terminal. That is, the amount of current sourced though the transistor 44 varies in accordance with the conduction state of the transistor 44 in the manner of a linear regulator.

The current sourced through transistor 44 stops the output voltage $V_O$ from falling or slows its rate of fall and then causes the output voltage $V_O$ to rise. Once the output voltage $V_O$ returns to within approximately one $V_{be1}$ drop of the first threshold voltage $V_L$, as a result of either current sourced by the load compensation circuit 40 or from the voltage regulator itself, transistor 44 stops conducting, thereby stopping the flow of current from the load compensation circuit 40. That is, transistor 44 is turned off once the output voltage $V_O$ returns to the first predetermined voltage level of $V_L - V_{be1}$.

If the output voltage $V_O$ rises to a level equal to or greater than one base-to-emitter voltage drop of transistor 46 (i.e., $V_{be2}$) above the second threshold voltage $V_H$, such as may occur when there is a sudden decrease in the load requirement, transistor 46 begins to conduct. Thus, the second predetermined voltage level, corresponding to the level of output voltage capable of activating the load compensation circuit 40 to sink current, is equal to $V_H + V_{be2}$. Conduction of transistor 46 causes current to be diverted from the output terminal 20 of the regulator 10 and thus, also from the load 42 coupled thereto. More particularly current is diverted from the output terminal 20, through transistor 46, and to the return terminal 21 of the regulator 10, or ground. Transistor 46 too is linearly operable to divert an amount of current related to the voltage across its base and emitter terminals and thus, also as a function of the output voltage $V_O$ coupled to its emitter terminal, in the manner of a linear regulator.

The sinking, or diversion of current by transistor 46 causes the output voltage $V_O$ to decrease. Once the output voltage $V_O$ returns to the specified tolerance range, transistor 46 is turned off thereby stopping the diversion of current. More particularly, once the output voltage level has dropped to the second predetermined voltage level of $V_H + V_{be2}$, transistor 46 stops conducting.

As is apparent from the above discussion, the first predetermined voltage level corresponding to the level of output voltage at which the load compensation circuit 40 is activated to source current is $V_L - V_{be1}$ and the second predetermined voltage level corresponding to the level of output voltage at which the load compensation circuit 40 is activated to sink current is $V_H + V_{be2}$. Thus, in an illustrative example where the nominal DC output voltage is 5.0 volts with a specified tolerance range of ±5% and $V_{be1} = V_{be2} = 0.7$ volts, the first predetermined voltage level may be selected to activate the load compensation circuit 40 to source current when the output voltage $V_O$ is approximately 4.75 volts (i.e., requiring that the first threshold voltage $V_L$ be approximately 5.45 volts) and the second predetermined voltage level may be selected to activate the load compensation circuit 40 to sink current when the output voltage $V_O$ is approximately 5.25 volts (i.e., requiring that the second threshold voltage $V_H$ be approximately 4.55 volts). However, it should be appreciated that the selection of the first and second predetermined voltage levels and the related first and second threshold voltages $V_L$, $V_H$ may be varied in accordance with application requirements. Having selected the first and second threshold voltages $V_L$, $V_H$, the resistors 50–56 of the resistor divider network 48 are selected accordingly.

As noted above, the first and second threshold voltages $V_L$, $V_H$ are derived from a reference voltage source $V_{REF}$ With a resistor divider network 48. The reference voltage coupled to the non-inverting input of the error amplifier 34 is derived from the same, common reference voltage source $V_{REF}$. With this arrangement, the first and second threshold voltages $V_L$, $V_H$ will track the DC output voltage, thereby minimizing the effect of component tolerances on the output voltage levels capable of activating and de-activating the load compensation circuit 40.

Figure 3:
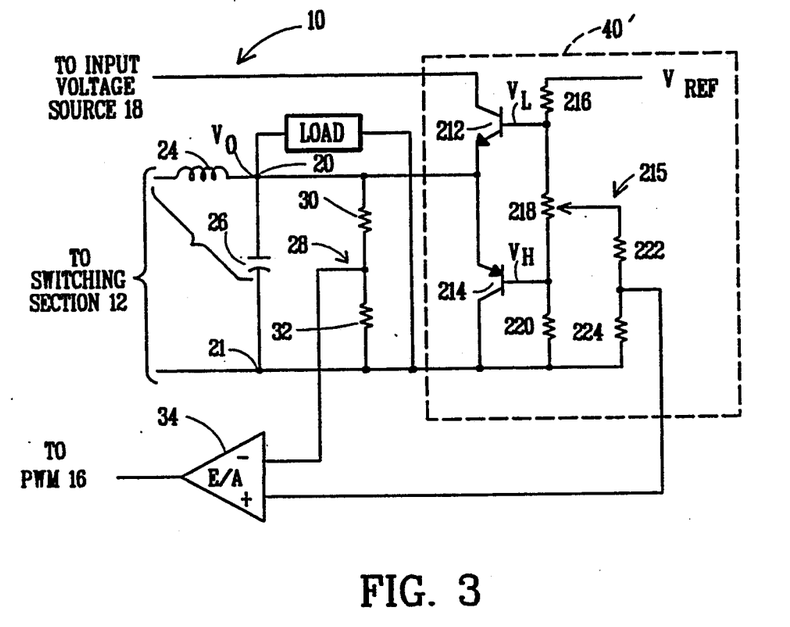
FIG. 3 shows an alternate threshold voltage circuit for the load compensation circuit of FIG. 2.
Figure 4:
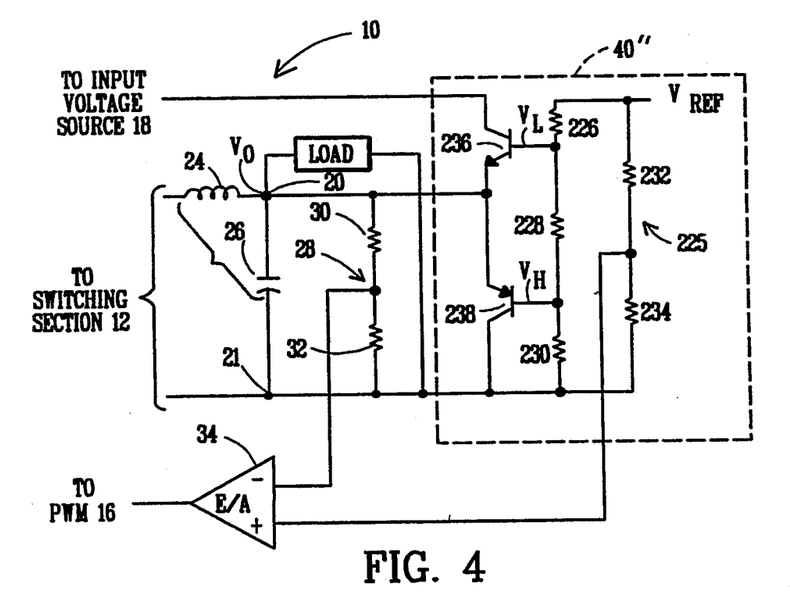
FIG. 4 shows a further alternate threshold voltage circuit for the load compensation circuit of FIG. 2.

As will be apparent to those of skill in the art, various schemes are possible for providing the first and second threshold voltages $V_L$, $V_H$, and the reference voltage for coupling to the error amplifier 34. Examples of two such alternative schemes are shown in FIGS. 3 and 4. In the load compensation circuit 40' of FIG. 3, the first and second threshold voltages $V_L$, $V_H$ and the error amplifier reference voltage are provided by a resistor divider network 215 including resistors 216, 218, 220, and 224. An alternate resistor divider network 225 is shown in the load compensation circuit 40" of FIG. 4 for providing the first and second threshold voltages $V_L$, $V_H$ and the error amplifier reference voltage.

Figure 5:
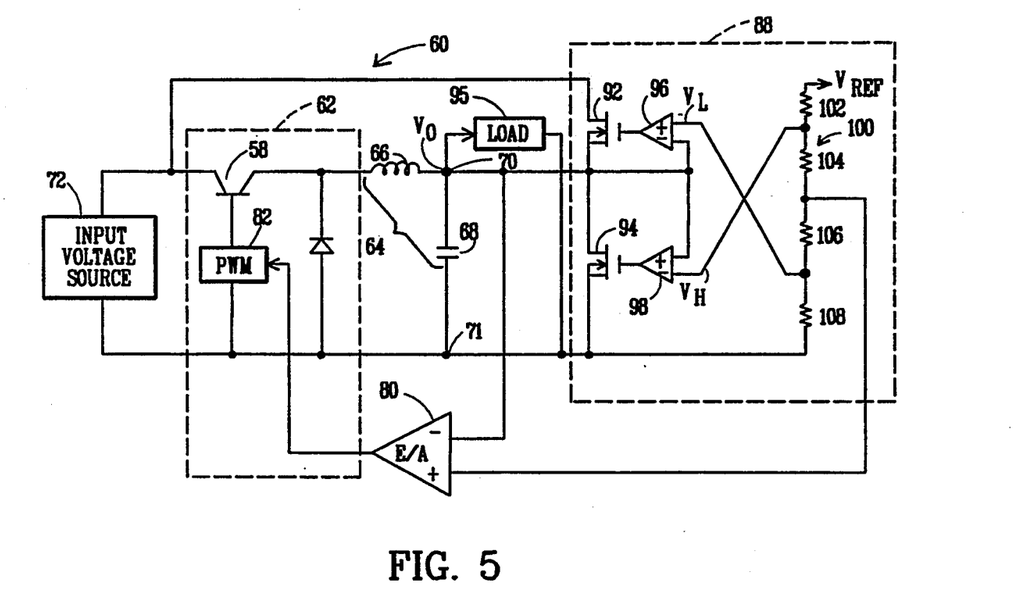
FIG. 5 is a schematic diagram of an alternate embodiment of the switching regulator of FIG. 1.

Referring to FIG. 5, an alternate embodiment 60 of the switching regulator of FIG. 1 is shown to include a switching section 62 of a buck converter topology, like switching section 12 of FIG. 2. Regulator 60 further includes an output filter 64 having an inductor 66 and a capacitor 68 coupled between the switching section 62 and the regulator's output terminal 70. The switching regulator 60 is adapted for coupling to an unregulated DC input voltage source 72. Regulator 60 provides a DC output voltage $V_O$ at the output terminal 70, the nominal level of which is regulated by a feedback circuit including error amplifier 80 and PWM controller 82. In response to an error signal provided by the error amplifier 80, the PWM controller 82 controls the duty cycle of the power switch 58 to alternately couple and decouple the input voltage source 72 to and from the regulator output terminal 70 through the output filter 64 in the manner discussed above in conjunction with FIG. 2.

Also provided is a load compensation circuit 88 coupled to the regulator output terminal 70 and thus also to a load 95 coupled to the output terminal 70. The load compensation circuit 88 includes a first current amplifier 92 coupled between the input voltage source 72 and the regulator output terminal 70 and a second current amplifier 94 coupled between the output terminal 70 and the return terminal 71 of the regulator 60, or ground. In the illustrative embodiment of FIG. 5, current amplifiers 92 and 94 are both N-channel Field-Effect-Transistors (FETs). However, one of skill in the art will appreciate that other types of current amplifier arrangements may be used in conjunction with the load compensation circuit 88.

The load compensation circuit 88 further includes buffer amplifiers 96, 98, each one coupled to the control terminal of one of the first and second transistors 92, 94, respectively, as shown. More particularly, the first buffer amplifier 96 receives a first threshold voltage $V_L$ and the output voltage $V_O$ and provides a drive signal to the gate of transistor 92. Similarly, the second buffer amplifier 98 receives a second threshold voltage $V_H$ and the output voltage $V_O$ and provides a drive signal to the gate of transistor 94. A resistor divider network 100, including resistors 102, 104, 106, and 108, is coupled across a reference voltage source $V_{REF}$ to provide the first and second threshold voltages $V_L$, $V_H$, respectively, as shown.

In operation, when the output voltage $V_O$ drops below the first threshold voltage level $V_L$, such as may be caused by a sudden increase in the load requirement, the drive signal provided by buffer amplifier 96 causes transistor 92 to conduct. When transistor 92 conducts, a current is sourced from the input voltage source 72 through transistor 92 and to the load 95. The amount of current sourced by transistor 92 is a function of the voltage level of the drive signal provided by buffer amplifier 96 and thus, is a function of the difference between the output voltage $V_O$ and the first threshold voltage $V_L$ coupled to the inputs of the amplifier 96. Once the output voltage $V_O$ returns to above the first threshold voltage level $V_L$, the drive signal provided by the buffer amplifier 96 stops the conduction of transistor 92 and thus also the supply of current therethrough.

In response to an increase in the output voltage $V_O$, such as may be caused by a sudden decrease in the load requirement, buffer amplifier 98 activates transistor 94. More particularly, when the output voltage $V_O$ rises above the second threshold voltage level $V_H$, the drive signal provided by the buffer amplifier 98 causes transistor 94 to conduct. In conduction, transistor 94 causes current to be diverted from the regulator output terminal 70 through transistor 94 and to the return terminal 71 of the regulator 60, or ground. The amount of current diverted, or sunk by transistor 94 is a function of the level of the drive signal provided by amplifier 98 and thus, is a function of the difference between the output voltage $V_O$ and the second threshold voltage $V_H$ coupled to the inputs of the buffer amplifier 98. Once the output voltage $V_O$ returns below to the second threshold voltage level $V_H$, the drive signal provided by amplifier 98 causes transistor 94 to stop conducting.

As should now be apparent, in the embodiment of FIG. 5, the first and second predetermined voltage levels, corresponding to the levels of the output voltage $V_O$ capable of activating and de-activating the load compensation circuit 88 to source and sink current, respectively, are equal to the first and second threshold voltages $V_L$, $V_H$. This is contrasted to the embodiment of FIG. 2 in which the first and second predetermined voltage levels are one $V_{be}$ drop less than or greater than the first and second threshold voltages $V_L$, $V_H$, respectively.

The first and second threshold voltages $V_L$, $V_H$ and the reference voltage coupled to the non-inverting input of error amplifier 80 are derived from the same reference voltage source $V_{REF}$. As noted above, this arrangement provides the advantage that the threshold voltages $V_L$, $V_H$ will track the output voltage $V_O$. The load compensation circuit 88 has several additional advantages. First, the high impedance of the buffer amplifiers 96, 98 prevents disadvantageous loading of the resistor divider 100, such as may cause the first and second threshold voltage levels to vary. Additionally, use of the buffer amplifiers 96, 98 enables the use of N-channel FETs 92, 94 for both the sourcing and sinking functions of the load compensation circuit 88, thereby providing cost benefits. Moreover, use of the buffer amplifiers 96, 98 to drive transistors 92, 94, respectively, eliminates variations in the first and second predetermined voltage levels of the output voltage $V_O$ capable of activating the load compensation circuit 88, as may occur in the embodiment of FIG. 2 due to variations in the $V_{be}$ drops of the bipolar transistors 44, 46.

Figure 6:
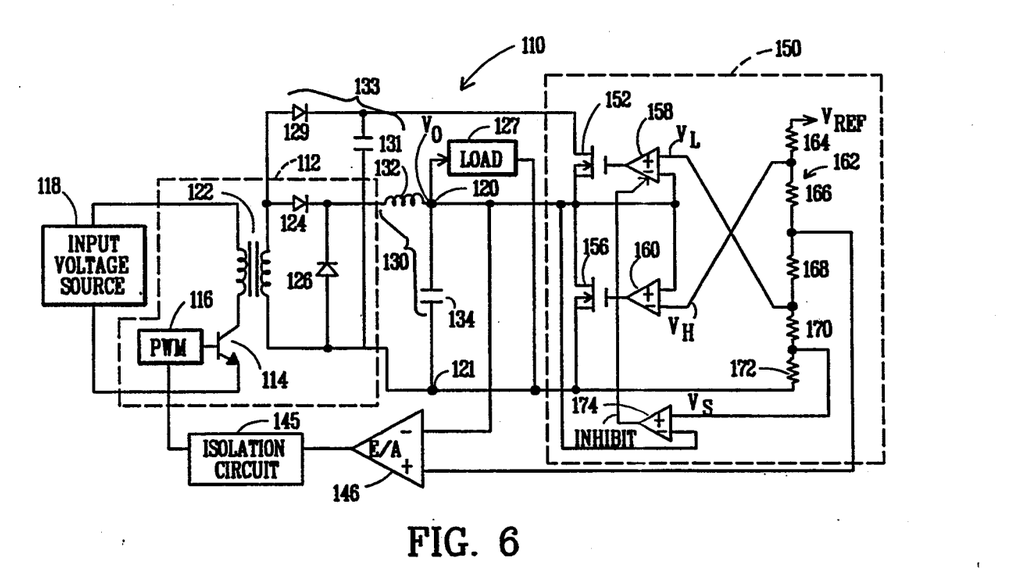
FIG. 6 is a schematic diagram of a further alternate embodiment of the switching regulator of FIG. 1.

Referring to FIG. 6, a further embodiment 110 of the switching regulator of FIG. 1 is shown to include a switching section 112 having a forward converter topology. More particularly, switching section 112 includes a power switch 114 for alternately coupling and decoupling an unregulated DC input voltage source 118 to and from an output terminal 120 of the regulator 110 through an output filter 130 comprising an inductor 132 and a capacitor 134. A controller, such as PWM controller 116, is provided for controlling the duty cycle of the power switch 114 to maintain the output voltage $V_O$ within a specified range related to a predetermined, nominal level. More particularly, an error amplifier 146 receives the output voltage $V_O$ and a reference voltage and provides an error signal to the PWM controller 116 for controlling the duty cycle of power switch 114. The switching section 112 further may include a transformer 122 providing isolation between the input voltage source 118 and the regulator output terminal 120. Diodes 124, 126 alternately conduct in response to the conduction and non-conduction of the power switch 114, respectively, as is conventional.

A load compensation circuit 150 includes transistors 152, 156 and buffer amplifiers 158, 160 which are operable in the same manner as like components in the load compensation circuit 88 of FIG. 5. First and second threshold voltages $V_L$, $V_H$ coupled to the buffer amplifiers 158, 160, respectively, are derived from a reference voltage source $V_{REF}$ with a resistor divider network 162. Resistor divider network 162, including resistors 164–172, additionally provides a reference voltage to the non-inverting input of the error amplifier 146, as shown.

In the load compensation circuit 150 of FIG. 6, the current sourcing transistor 152 is coupled between a peak charging energy source 133 and the output terminal 120. More particularly, the peak charging energy source 133 includes a diode 129 and a capacitor 131. The diode 129 is coupled between the secondary winding of the transformer 122 and the capacitor 131 to peak charge the capacitor from the alternating voltage across the secondary winding of the transformer 122. An isolation circuit 145 is also provided to isolate the output coupled error amplifier 146 from the input coupled PWM 116, as shown. With this arrangement transformer isolation between the input voltage source 118 and the output terminal 120 of the regulator 110 is maintained.

Load compensation circuit 150 additionally includes a disable, or inhibit, circuit for disabling the load compensation circuit 150 in the event of a short circuit across the output terminals 120, 121 of the regulator 110. More particularly, in circumstances in which the regulator output terminals are shorted, it is desirable to disable the load compensation circuit so that the first, current sourcing transistor 152, which is activated by buffer amplifier 158 in response to the output voltage of $V_O$ falling below the first threshold voltage level $V_L$, is prevented from supplying current to the output terminal 120. Generally, the inhibit circuit compares the output voltage $V_O$, or a voltage proportional thereto, to a reference voltage which is characteristic of a short circuit across the regulator's output terminals 120, 121, and provides an inhibit, or disable signal indicative of whether or not the output voltage signal is less than the reference voltage. When the output voltage signal is less than the reference voltage, the inhibit signal disables the current sourcing capability of the load compensation circuit 150.

In the illustrative embodiment of FIG. 6, the disable circuit includes a comparator 174 receiving a voltage having a third predetermined voltage level $V_S$ from resistor divider 162 and also receiving the output voltage $V_O$ of the regulator 110. The third predetermined voltage level $V_S$ corresponds to a level of the output voltage indicative of a short circuit across the regulator's output terminals 120, 121. When the regulator output voltage $V_O$ is less than the third predetermined voltage level $V_S$, the output of the comparator 174 transitions, causing the current sourcing portion of the load compensation circuit 150 to be disabled, or inhibited. Specifically, the comparator output signal is coupled to the buffer amplifier 158 so that, in response to the output voltage $V_O$ falling below the third predetermined voltage level $V_S$, the buffer amplifier 158 is disabled, or decoupled from the control terminal of current sourcing transistor 152. In this way, comparator 174 ensures that transistor 152 will not be turned on to supply current to the regulator output terminal 120 under short circuit conditions.

Figure 7:
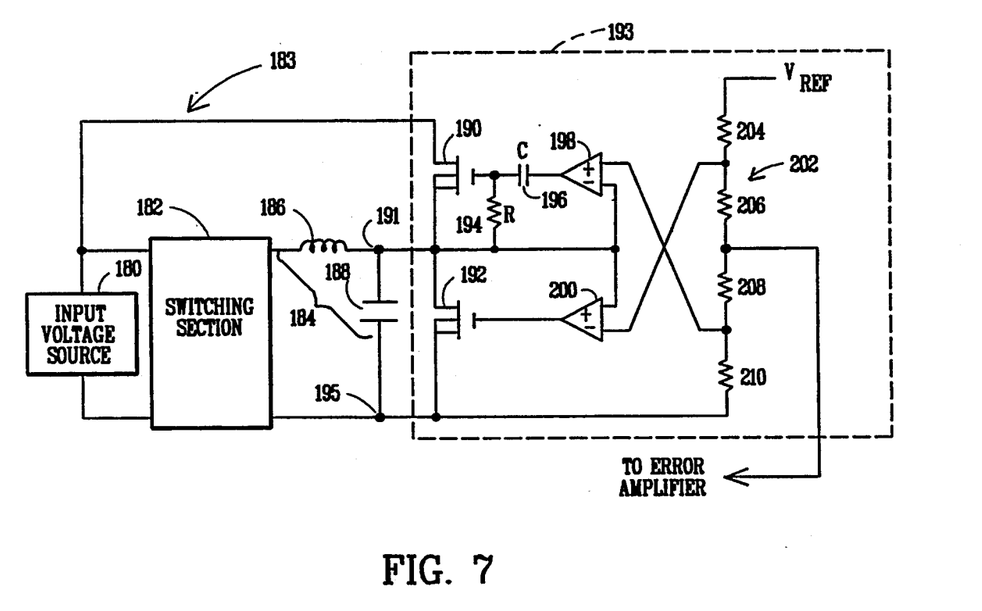
FIG. 7 is a schematic diagram of another alternate embodiment of the switching regulator of FIG. 1.

Referring to FIG. 7, another embodiment 183 of the switching regulator of FIG. 1 includes a switching section 182, an output filter 184, including inductor 186 and capacitor 188, and a load compensation circuit 193. The switching section 182 and output filter 184 are analogous to like components described above. The load compensation circuit 193 includes current amplifiers 190, 192, buffer amplifiers 198, 200, and resistor divider 202 operable in the manner of like components described above in conjunction with FIG. 6 to source or sink current in order to accommodate sudden load changes. In the embodiment of FIG. 7 however, an alternate inhibit circuit is provided by resistor 194 and capacitor 196 coupled between the first buffer amplifier 198 and the gate, or control terminal of transistor 190. More particularly, the capacitor 196 is coupled between the output of buffer amplifier 198 and the gate terminal of transistor 190. Resistor 194 is coupled between the gate terminal of transistor 190 and the regulator output terminal 191.

The resistor 194 and capacitor 196 control the duration that the current sourcing transistor 190 conducts after the output voltage $V_O$ falls below the first threshold voltage $V_L$. That is, the RC circuit causes the transistor 190 to return to its nonconducting state after an interval determined by the time constant associated with resistor 194 and capacitor 196. The values of the resistor 194 and capacitor 196 are selected so that the current sourcing transistor 190 conducts for long enough to respond to dynamic load changes of a specified duration. However, the time constant is short enough to prevent an undesirable supply of current to the output terminal 191 during a steady state short circuit condition across the regulator's output terminals 190, 195. Thus, with this arrangement, the current sourcing transistor 190 responds only to dynamic load changes during a predetermined interval and is prevented from continuously supplying current to the output terminal 191 during a steady state short circuit condition.

Having described the preferred embodiments of the invention, it will be apparent to one of skill in the art that other embodiments incorporating their concepts may be used. For example, the switching sections 12, 62 (FIGS. 2 and 5) are conventional buck converter arrangements and the switching section 112 (FIG. 6) is a conventional forward converter arrangement. However, one of skill in the art will appreciate that other switching section topologies, such as a flyback switching section, a half-bridge switching section, or a full-bridge switching section, are equally suitable for use with the load compensation circuits described herein. Accordingly, the invention should be limited only by the spirit and scope of the appended claims.

We claim:

1. A power supply having an input terminal adapted for coupling to an input voltage source and an output terminal adapted for coupling to a load, said power supply providing a DC output voltage and a first, load current at said output terminal and comprising:
   a power switch for alternately coupling and decoupling said input voltage source to said output terminal at a predetermined frequency and with a predetermined duty cycle;
   a feedback circuit for controlling said duty cycle of said power switch to maintain said DC output voltage within a specified tolerance range;
   a filter coupled between said power switch and said output terminal and including an inductor and a capacitor for providing said DC output voltage at said output terminal; and
   a load compensation circuit coupled to said output terminal and activated to source a second current from said load compensation circuit to said load when said output voltage is less than a first predetermined voltage level or to divert a portion of said first, load current from said load when said output voltage is greater than a second predetermined voltage level, wherein said load compensation circuit is de-activated when said output voltage is between said first and second predetermined levels.

2. The power supply recited in claim 1 wherein said load compensation circuit is activated both to source said second current to said load when said output voltage is less than said first predetermined voltage level and to divert said portion of said first, load current from said load when said output voltage is greater than said second predetermined voltage level.

3. The power supply recited in claim 2 wherein said load compensation circuit includes a first current amplifier coupled between said input voltage source and said output terminal for sourcing said second current from said load compensation circuit to said load when said output voltage is less than said first predetermined voltage level and a second current amplifier coupled between said output terminal and ground for diverting said portion of said first, load current from said load when said output voltage is greater than a second predetermined voltage level.

4. The power supply recited in claim 3 wherein said first current amplifier has a control terminal responsive to a first threshold voltage and said second current amplifier has a control terminal responsive to a second threshold voltage, wherein said first and second threshold voltages are related to said first and second predetermined voltage levels, respectively.

5. The power supply recited in claim 4 wherein said feedback circuit includes a pulse width modulator and an error amplifier receiving a signal indicative of said DC output voltage and a reference voltage and providing an error signal to said pulse width modulator.

6. The power supply recited in claim 5 wherein said reference voltage, said first threshold voltage coupled to said control terminal of said first current amplifier, and said second threshold voltage coupled to said control terminal of said second current amplifier are derived from a common reference voltage source with a resistor divider network.

7. The power supply recited in claim 6 further comprising a first buffer amplifier coupled between said resistor divider network and said control terminal of said first current amplifier and a second buffer amplifier coupled between said resistor divider network and said control terminal of said second current amplifier.

8. The power supply recited in claim 1 further comprising an inhibit circuit for preventing said load compensation circuit from sourcing said second current to said load when said output voltage is below a third predetermined voltage level indicative of said output terminal being shorted to ground.

9. The power supply recited in claim 8 wherein said inhibit circuit comprises a comparator receiving a voltage proportional to said output voltage and a voltage equal to said third predetermined voltage level, said comparator providing a disable signal to decouple said first buffer amplifier from said control terminal of said first current amplifier in response to said proportional voltage being less than or equal to said third predetermined voltage level.

10. The power supply recited in claim 3 further comprising an inhibit circuit for limiting the duration of activation of said first current amplifier.

11. The power supply recited in claim 10 wherein said inhibit circuit comprises a resistor and a capacitor coupled between said first buffer amplifier and said control terminal of said first current amplifier.

12. The power supply recited in claim 3 wherein the amount of said second current sourced by said first current amplifier or diverted by said second current amplifier varies linearly with the output voltage.

13. A load compensation circuit adapted for coupling to an output terminal of a switching power supply at which an output voltage and a first, load current is provided, said load compensation circuit comprising:
    a current source circuit portion for supplying a second current to said output terminal when said output voltage is less than a first predetermined level; and
    a current sink circuit portion for diverting a portion of said first, load current from said output terminal when said output voltage is greater than a second predetermined level, wherein said second predetermined level is greater than said first predetermined level.

14. The load compensation circuit recited in claim 13 wherein said current source circuit portion comprises a first current amplifier having a first terminal coupled to a voltage source, a second terminal coupled to said output terminal, and a third, control terminal responsive to a first threshold voltage related to said first predetermined level of said output voltage and said current sink circuit portion comprises a second current amplifier having a first terminal coupled to ground, a second terminal coupled to said output terminal, and a third, control terminal responsive to a second threshold voltage related to said second predetermined level of said output voltage.

15. The load compensation circuit recited in claim 14 further comprising a reference voltage source providing said first threshold voltage and said second threshold voltage.

16. The load compensation circuit recited in claim 15 further comprising a first buffer amplifier coupled between said reference voltage source and said control terminal of said first current amplifier for providing a drive signal to said control terminal of said first current amplifier and a second buffer amplifier coupled between said reference voltage source and said control terminal of said second current amplifier for providing a drive signal to said control terminal of said second current amplifier.

17. The load compensation circuit recited in claim 13 further comprising an inhibit circuit for disabling said current source circuit portion when said output voltage is less than a third predetermined voltage level indicative of said output terminal being shorted to ground.

18. The load compensation circuit recited in claim 17 wherein said inhibit circuit comprises a comparator responsive to a voltage proportional to the output voltage and a voltage equal to said third predetermined voltage level for providing a disable signal to prevent said current source from supplying said second current to said output terminal when said proportional voltage is less than said third predetermined voltage level.

19. The load compensation circuit recited in claim 13 wherein the amount of said second current supplied by said current source circuit portion and the amount of said portion of said first, load current diverted by said current sink circuit portion varies linearly with the output voltage.

20. The load compensation circuit recited in claim 16 further comprising inhibit circuit for limiting the duration of activation of said first current amplifier.

21. The load compensation circuit recited in claim 20 wherein said inhibit circuit comprises a resistor and a capacitor coupled between the output of said first buffer amplifier and said control terminal of said first current amplifier.

22. A power supply comprising:
a power switch adapted for coupling to an input voltage source;
an output terminal adapted for coupling to a load, said power supply providing a DC output voltage and a first, load current at said output terminal;
a feedback circuit coupled between said output terminal and said power switch for controlling said power switch; and
a load compensation circuit coupled to said output terminal and activated to source a second current to said load when said output voltage is less than a first predetermined voltage level or to divert a portion of said first, load current from said load when said output voltage is greater than a second predetermined voltage level, wherein said load compensation circuit is de-activated when said output voltage is between said first and second predetermined levels.

23. The power supply recited in claim 22 wherein said load compensation circuit is activated both to source said second current to said load when said output voltage is less than said first predetermined voltage level and to divert said portion of said first, load current from said load when said output voltage is greater than said second predetermined voltage level.

24. The power supply recited in claim 23 wherein said load compensation circuit includes a first current amplifier coupled between said input voltage source and said output terminal for sourcing said second current from said load compensation circuit to said load when said output voltage is less than said first predetermined voltage level and a second current amplifier coupled between said output terminal and ground for diverting said portion of said first, load current from said load when said output voltage is greater than said second predetermined voltage level.

25. The power supply recited in claim 24 wherein said first current amplifier has a control terminal responsive to a first threshold voltage and said second current amplifier has a control terminal responsive to a second threshold voltage, wherein said first and second threshold voltages are related to said first and second predetermined voltage levels, respectively.

26. The power supply recited in claim 25 wherein said first threshold voltage coupled to said control terminal of said first current amplifier and said second threshold voltage coupled to said control terminal of said second current amplifier are derived from a common reference voltage source with a resistor divider network.

27. The power supply recited in claim 26 further comprising a first buffer amplifier coupled between said resistor divider network and said control terminal of said first current amplifier and a second buffer amplifier coupled between said resistor divider network and said control terminal of said second current amplifier.

28. The power supply recited in claim 22 further comprising an inhibit circuit for preventing said load compensation circuit from sourcing said second current to said load when said output voltage is below a third predetermined voltage level indicative of said output terminal being shorted to ground.

29. The power supply recited in claim 23 further comprising an inhibit circuit for limiting the duration of activation of said first current amplifier.

* * * * *